United States Patent Office.

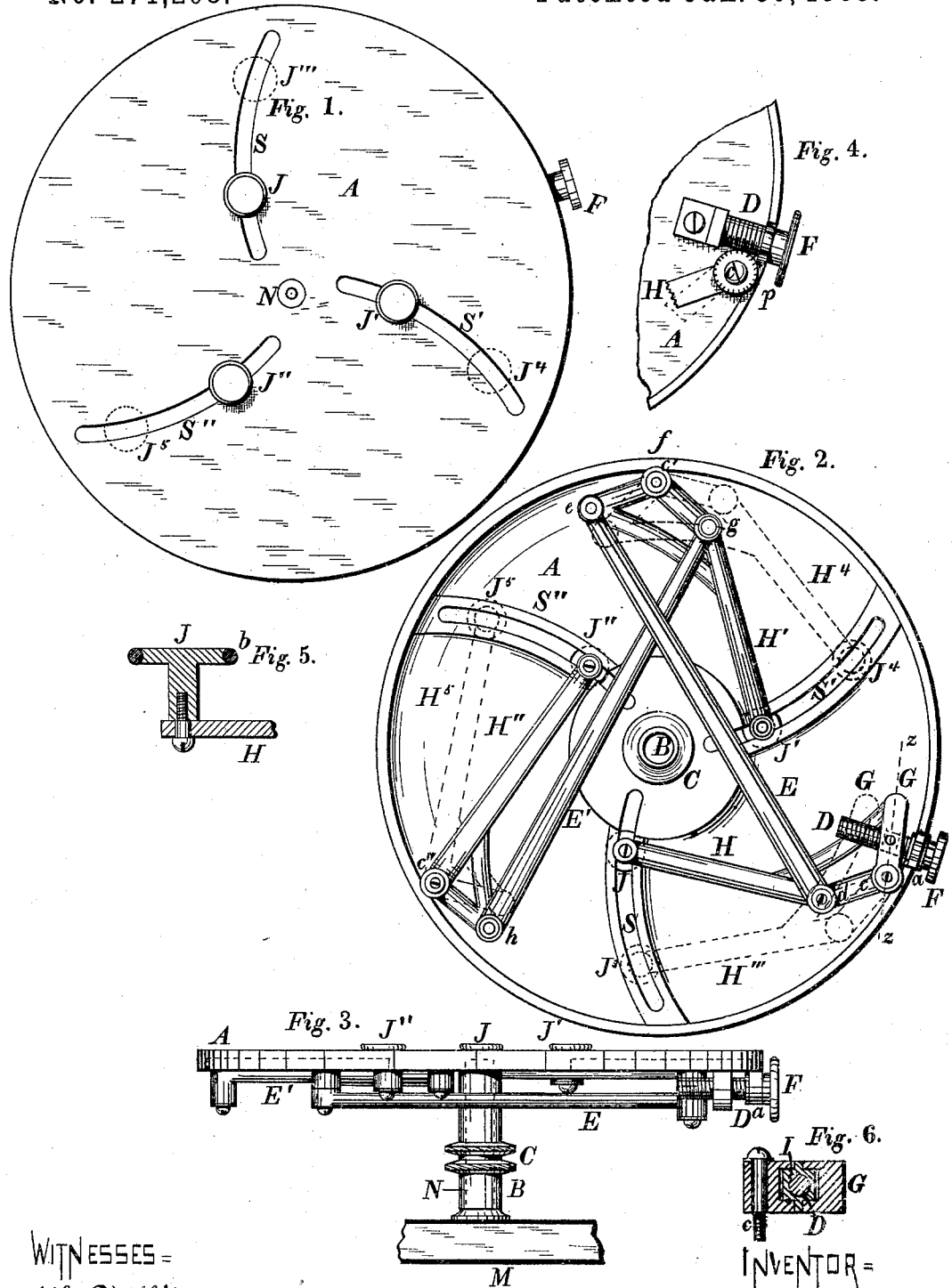

HENRY H. BARNARD, OF ROCHESTER, NEW YORK, ASSIGNOR TO MILLICENT B. ALLING, OF SAME PLACE.

CHUCK.

SPECIFICATION forming part of Letters Patent No. 271,208, dated January 30, 1883.

Application filed April 14, 1881. Renewed September 13, 1882. (No model.)

*To all whom it may concern:*

Be it known that I, HENRY H. BARNARD, of Rochester, in the county of Monroe and State of New York, have invented an Improved Chuck, of which the following is a specification, reference being had to the accompanying drawings.

My invention relates to certain improvements in chucks, designed more particularly to be employed in the decoration of articles of china or pottery, but capable of being used for many other purposes; and my invention consists in providing the centering-jaws of my improved chuck with an elastic cushion interposed between them and the article of china-ware for the purpose of compensating for the irregularities in the outline of the latter.

My invention also consists in the construction and arrangement of the mechanism for operating the centering-jaws, as hereinafter more fully set forth.

My improved chuck is represented in the accompanying drawings, in which Figure 1 is a plan view. Fig. 2 is a reversed view, showing the means by which the jaws are operated. Fig. 3 is a side elevation. Fig. 4 represents a modification. Fig. 5 is a vertical section of one of the jaws. Fig. 6 is a section on the line $zz$, Fig. 2.

In the accompanying drawings, representing my improved chuck, A is the face-plate; B, the hub, cast with the face-place, turning freely on the spindle N, projecting from the base M, provided with a milled thumb-nut, C. The face-plate is provided with curved slots S S' S'', in which the jaws J J' J'' slide uniformly to and from the center. The jaws are fastened to the arms H H' H'', which are pivoted to the under side of the face-place at $c\ c'\ c''$. The arms are joined together by the bars E E', so that they move equally to and from the center. (See Fig. 2.) One of the arms, H, is provided with a fixed screw, D, which turns in a nut, I, pivoted in the arm G, as shown in section in Fig. 6.

In the operation of my improved chuck the screw D, being revolved by means of the milled head F, carries the nut I forward or backward, thereby causing the arms H H' H'' to swing about the pivots $c\ c'\ c''$ and the jaws to move toward or away from the center of the face-plate.

The bar E is pivoted to the arm H at $d$ and to the arm H' at $e$, and the arm H' is connected to the arm H'' by bar E', pivoted at $g$ on H', and at $h$ on H''. The arm E is raised above the arm E' by making the hubs on the arms and bars at $e$ and $d$ sufficiently long to enable the arms E and E' to clear each other.

The positions of the jaw-carrying arms when the jaws are widely separated is indicated by the dotted lines H''' H$^4$ H$^5$ in Fig. 2. The screw D is provided with collars fitted on each side of a divided lug, $a$, Fig. 1, attached to the rim of the face-plate, by which the screw is prevented from sliding lengthwise.

The nut I may be pivoted within the arm G in a slot, which permits the swinging motion of the arm, while the screw D remains stationary; or the screw may be allowed to swing slightly to accommodate itself to the motion of the arm.

The jaws J J' J'' are provided with hubs passing through the slots in the face-plate, and pivoted to the ends of the swinging arms by a screw or pin, as shown in Fig. 5.

For the purpose of holding articles of china or pottery ware during the process of decoration, the jaws are provided with a rubber ring, $b$, Fig. 5, which adapts itself to any irregularities in the outline of the article operated upon, and holds the same in place with sufficient pressure to secure it centrally on the face-plate without danger of breakage. For other purposes, however, the rubber bands may be omitted, and the jaws made of any preferred form. For wood-turning, the jaws of my improved chuck may be toothed or serrated on their inner faces.

In Fig. 4 I have represented a modified arrangement of the device for moving and clamping the jaws, in which the pivoted end of the arm H is provided with a worm-gear, $p$, meshing with the worm D, provided with a thumb-nut, F, and attached to the under side of the face-plate in any convenient way. By revolving the thumb-nut F in one direction or the other the arm H is caused to swing about its pivotal point $c$ and the jaws are opened or closed on the object to be chucked, which is secured to the face-plate by pressing the jaws against it by the pressure produced by the worm. The face-plate is preferably made thin and provided with ribs about its edge and about the slots S S' to secure strength with lightness. A spindle, N, (shown by dotted lines in Fig. 3,) rising upward from any suitable table or brace M, supports the hub B of the face-plate, which turns freely thereon.

The operation of my improved chuck will be readily understood from the preceding description. The jaws being separated by turning the thumb-nut F, the article to be chucked is placed on the face-plate, and secured thereon by pressing the jaws against it by the action of the screw. After the article of pottery-ware has been centered on the face-plate, the latter is revolved by the operator turning the milled head C with one hand, while the other hand is left free to ornament the vase, plate, or other object in any preferred manner.

The jaws of my improved chuck are round, so that they present a similar surface to the object to be chucked in any position which they may occupy in the curved slots. The round jaws provided with grooves also afford a simple and effective mode of attaching the rubber rings b to them.

I claim—

1. In a chuck for holding articles of pottery-ware, the combination, with the face-plate A, of the movable jaws J J' J'', provided with an elastic cushion, substantially as and for the purposes set forth.

2. The combination, with the slotted face-plate A, of the movable jaws J J' J'', pivoted arms H H' H'', connecting-bars E E', and screw D, substantially as and for the purposes set forth.

3. The combination, with the face-plate A, of the movable jaws J J' J'', provided with grooves for the reception of the elastic bands b b b, substantially as described.

HENRY H. BARNARD.

Witnesses:
GEO. B. SELDEN,
H. G. PHILLIPS.